Dec. 3, 1957
G. E. HIRT
2,815,008
EJECTION SEAT THRUSTER
Filed June 15, 1956
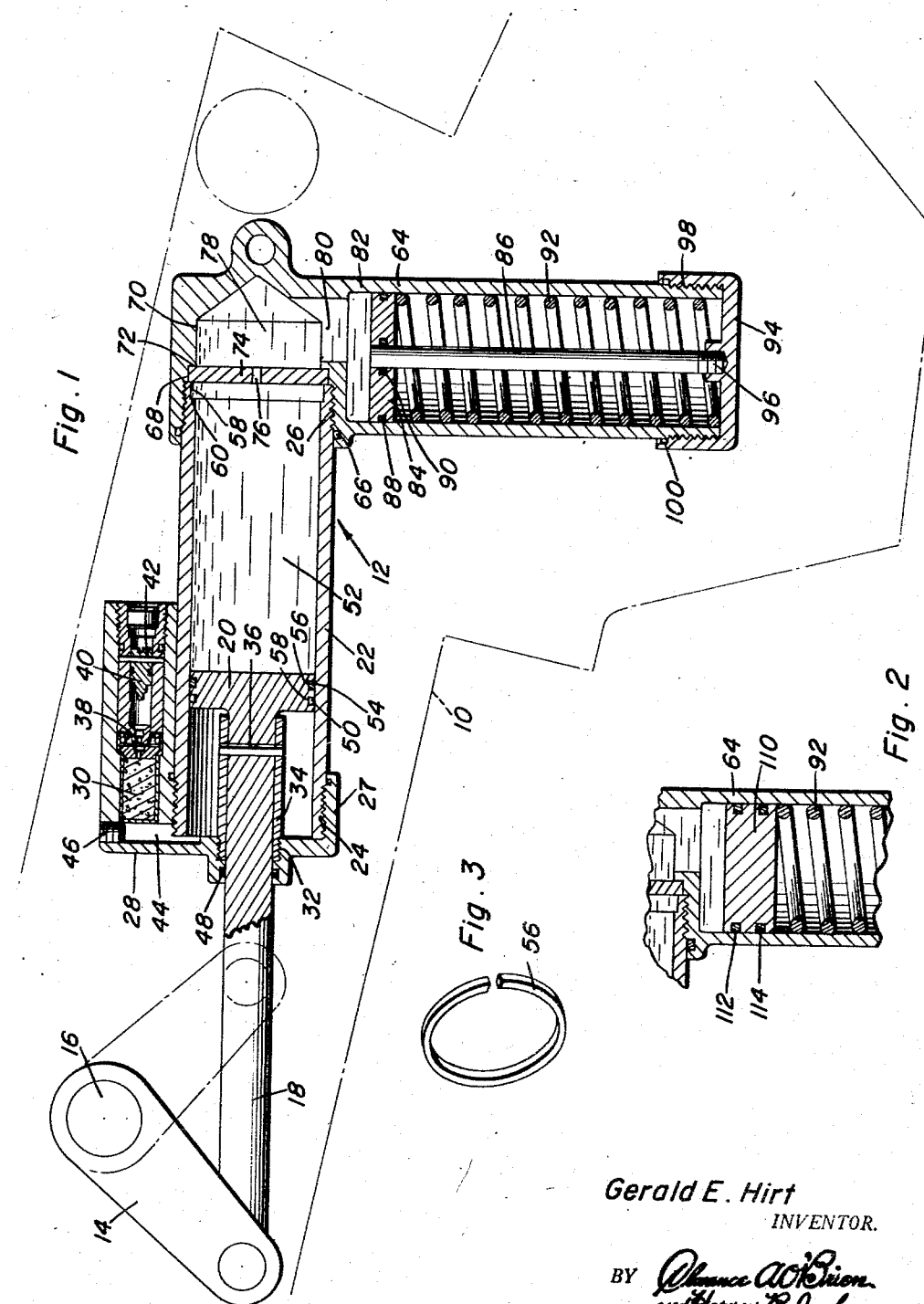
Gerald E. Hirt
INVENTOR.
BY
Attorneys ns
Patented Dec. 3, 1957

2,815,008

EJECTION SEAT THRUSTER

Gerald E. Hirt, New Haven, Conn., assignor to Talco Engineering Company, Inc., Hamden, Conn., a corporation of Connecticut Application June 15, 1956, Serial No. 591,612

4 Claims. (Cl. 123—24)

This invention relates to a device adapted to be utilized in conjunction with an ejection seat utilized on high speed aircraft for preventing injury to the occupant of an ejection seat when ejected.

The primary object of the present invention resides in the provision of an actuation device for controlling means for engaging the legs of an occupant of an ejection seat in a highly effective and efficient manner.

When an occupant of an aircraft is ejected downward from the aircraft in an ejection seat while the aircraft is travelling at a high rate of speed, it is necessary to restrain and constrain the legs of the occupant in order to prevent serious injury. Thus, suitable straps or the like are provided for holding the legs in a secure manner. However, during normal operation of the aircraft it is usually necessary for the occupant of the aircraft to have some freedom of movement of his legs for operation of the aircraft. Thus, the present invention provides means which upon actuation of the firing means of the ejection seat will cause the ejection seat thruster comprising the present invention to actuate the means to hold the limbs of the occupant in a secure manner.

A further object of the present invention resides in the provision of an ejection seat thruster which maintains itself in an operable condition even under severe temperature changes as will occur during operation of the aircraft at high and low altitudes and different temperature zones.

The construction of this invention features a cartridge actuated device having a piston which is held normally in a nonactuated position by a shear pin and which is locked after actuation in an operated position by a novel snap ring arrangement. Incorporated in the invention is means for maintaining hydraulic pressure against the face of the piston so that the rate of the operation of the thruster can be controlled independent of the temperature of the device at a time of actuation which might cause expansion or contraction of the hydraulic fluid. Further, there is incorporated in the invention a dash pot control provided by a restrictive orifice plate.

Still further objects and features of this invention reside in the provision of an ejection seat thruster that is simple in construction, which has been designed to fit within the comparatively small confines of a portion of an ejection seat, which is substantially fool-proof in operation, and which may be fired by any suitable means.

These, together with the various ancillary objects and features of the invention which will become apparent as the following description proceeds, are attained by this ejection seat thruster, preferred embodiments being shown in accompanying drawings, by way of example only, wherein:

Figure 1 is a sectional view of the ejection seat thruster comprising the present invention and showing schematically the compartment in the ejection seat in which the ejection seat thruster is positioned;

Figure 2 is a partial sectional detail view of the modified form of the invention employing a buffer piston operable without requiring a guide rod; and Figure 3 is a perspective view of a snap ring comprising one of the elements of the present invention.

With continuing reference to the accompanying drawings wherein like reference numerals designate similar parts throughout the various views, reference numeral 10 generally designates in phantom lines the space in an ejection seat available for the ejection seat thruster generally designated by reference numeral 12 and comprising the present invention. This ejection seat thruster is adapted to actuate a crank 14 for rotating a shaft 16 or other moving part for controlling to position of mechanism adapted to be attached to the legs of an occupant of an ejection seat.

The crank 14 is connected to a piston rod 18 having a piston 20 attached thereto. The piston 20 is movable within a body 22 of cylindrical configuration having externally threaded ends as at 24 and 26. The end 24 of the body 22 is threadedly secured in the end cap 27 of a housing 28 for a cartridge 30. Threadedly secured to the internally threaded portion 32 of the end cap 27 is a locking casing 34 through which a shear pin 36 extends, the shear pin also extending through a transverse bore in the piston rod 18. Thus, the shear pin locks the piston 20 in an initial position prior to actuation.

In order to fire the cartridge there is of course provided a primer as at 38 which is adapted to be actuated by a firing pin 40 which is fired by any suitable means, the means shown being connections for gas actuation means for the pin 40. Of course, a shear pin 42 is provided for holding the firing pin 40 against movement prior to actuation. It is to be recognized that electrical, mechanical, pneumatic, or other means may be provided for actuation of the firing pin 40 as may be desired. This actuation means can be, of course, controlled by the actuating switch provided for the occupant of the aircraft and actuated with other elements of the seat ejection apparatus.

Communicating the cartridge 30 with the portion of the body 22 behind the piston is an expansion chamber 44. A closing plug 46 is of course provided for the opening formed in the housing 28 during the manufacture of the expansion chamber 44. An O-ring seal 48 is provided between the piston rod 18 and the housing 28. An O-ring seal 50 is provided between the piston 20 and the body 22 since the body 22 is filled with hydraulic fluid as at 52. A snap ring 54 is fitted in an annular groove 56 in the piston 20 of similar arrangement to the annular groove 58 provided for the O-ring seal 50. The snap ring 54 which is also shown in Figure 3 is split and is adapted to expand partially out of the groove 56. The end 26 of the body 22 is provided with a portion of increased inner diameter as at 58 into which snap ring 54 can be expanded and bear against the shoulder 60 to prevent backward movement of the piston 20 after the snap ring has once expanded into the portion 58 of increased inner diameter.

Threadedly secured on the threaded end 26 of the body 22 is a buffer casing 64. This buffer casing is sealed by a suitable O-ring seal as at 66 and extends normal to the body 22 to allow for the configuration of the space available in the ejection seat as indicated at 10.

The casing 64 has a shouldered portion 68 of reduced inner diameter with respect to the threaded portion which is engaged on the body 44 and yet of greater inner diameter than the portion 70 so as to form a shoulder 72 against which an orifice plate 74 is adapted to bear. Hence, when the casing with the orifice plate 74 in position is threadedly secured on the body 22, the body 22 will bear against the orifice plate and then press the orifice plate against the shoulder to hold the orifice plate in position. The orifice plate 74 is of course provided with an orifice 76 through which fluid may pass and the fluid chamber 78 of the casing is filled with fluid. A passage 80 communicates the cylindrical portion 82 of the buffer housing 64 with the fluid chamber 78 so that fluid may bear against the face of the piston disk 84 slidably positioned on a guide rod 86. Seals as at 88 between the piston 84 and the casing 64 and at 90 between the guide 86 and the piston are provided. A coil spring 92 is positioned in the casing 64 and bears against the piston 84 to urge the piston 84 against the hydraulic fluid so as to maintain pressure on the hydraulic fluid and the hydraulic fluid to bear against the face of the piston 20. The spring 92 also bears against the end cap 94 which is threadedly secured on the end 96 of the guide rod 86 and also threadedly secured as at 98 on the end of the cylindrical portion of the casing 64. A seal as at 100 is provided as necessary.

The spring 92 will always maintain the piston 84 against the hydraulic fluid 52 so as to maintain the fluid under pressure. This will always maintain the fluid under pressure against the face of the piston 20 no matter how much the fluid expands or contracts due to normal temperature changes for the operation of the aircraft. Hence, when the cartridge is fired, there will be no void or gap which will allow the piston 20 to travel at an unfeasible rate causing too fast operation of the mechanism for engaging the legs of the occupant. Further, by maintaining pressure always on the face of the piston 20 hammer strokes of the piston 20 will be prevented.

In Figure 2 there is shown a modified form of the invention which in lieu of the piston 84 a piston 110 is utilized which is provided with two grooves for receiving O-ring seals as at 112 and 114. It is noted that the thickness of the piston 110 is such as to eliminate the necessity for the guide rod 86.

In operation, after the firing pin 40 has been actuated and the cartridge 30 fired, the expansion chamber 44 will provide means whereby the gas applied through the expansion chamber 44 and through the further expansion provided within the body against the inner face of the piston 20 to drive the piston against the hydraulic fluid 52 forcing the fluid to move through the orifice 76 and to depress the spring 92 by moving the piston 84 or 110. This dash pot effect will therefore provide a controlled rate of operation of the invention so as to prevent injury to the occupant of the ejection seat occuring from actual operation of the device and to prevent subsequent freedom of movement of the legs of the occupant of the ejection seat which might cause severe injury when the seat is ejected.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An ejection seat thruster comprising a housing, a cartridge positioned in said housing, means for firing said cartridge mounted in said housing, a body secured to said housing, an expansion chamber communicating said body with said housing, a piston movably positioned in said body, a piston rod attached to said piston, a buffer casing secured to said body communicating with said body, a flow restrictive orifice plate restricting communication between said body and said buffer casing, hydraulic fluid in said body, and means in said buffer casing maintaining pressure on said fluid in said body and against said piston, said body having an end portion adjacent said buffer casing having an enlarged inner diameter forming a shoulder, said piston having a snap ring engaged thereon, said snap ring being engageable with said shoulder when said piston is in an extended position.

2. An ejection seat thruster comprising a housing, a cartridge positioned in said housing, means for firing said cartridge mounted in said housing, a body secured to said housing, an expansion chamber communicating said body with said housing, a piston movably positioned in said body, a piston rod attached to said piston, said piston rod extending through said housing, a locking casing secured to said housing, a shear pin engaging said piston rod and said locking casing holding said piston rod against movement until said cartridge has been fired, a buffer casing threadedly secured to said body communicating with said body, a flow restrictive orifice plate restricting communication between said body and said buffer casing disposed between said body and said buffer casing and held in position by the threaded engagement of said body and said buffer casing, hydraulic fluid in said body, and means in said buffer casing maintaining pressure on said fluid in said body and against said piston, said body having an end portion adjacent said buffer casing having an enlarged inner diameter forming a shoulder, said piston having a snap ring engaged thereon, said snap ring being engageable with said shoulder when said piston is in an extended position.

3. An ejection seat thruster comprising a housing, a cartridge positioned in said housing, means for firing said cartridge mounted in said housing, a body secured to said housing, an expansion chamber communicating said body with said housing, a piston movably positioned in said body, a piston rod attached to said piston, a buffer casing secured to said body communicating with said body, a flow restrictive orifice plate restricting communication between said body and said buffer casing, hydraulic fluid in said body, a buffer piston in said buffer casing, and a spring in said buffer casing urging said buffer piston against said hydraulic fluid maintaining pressure on said fluid, said body having an end portion adjacent said buffer casing having an enlarged inner diameter forming a shoulder, said piston having a snap ring engaged thereon, said snap ring being engageable with said shoulder when said piston is in an extended position.

4. An ejection seat thruster comprising a housing, a cartridge positioned in said housing, means for firing said cartridge mounted in said housing, a body secured to said housing, an expansion chamber communicating said body with said housing, a piston movably positioned in said body, a piston rod attached to said piston, a buffer casing secured to said body communicating with said body, a flow restrictive orifice plate restricting communication between said body and said buffer casing, hydraulic fluid in said body, a buffer piston in said buffer casing, and a spring in said buffer casing urging said buffer piston against said hydraulic fluid maintaining pressure on said fluid, a guide rod in said buffer casing, said piston being slidably disposed on said guide rod, said buffer casing being disposed normal to said body, said body having an end portion adjacent said buffer casing having an enlarged inner diameter forming a shoulder, said piston having a snap ring engaged thereon, said snap ring being engageable with said shoulder when said piston is in an extended position.

References Cited in the file of this patent

UNITED STATES PATENTS

| | | |
|---|---|---|
| 1,535,619 | Methlin | Apr. 28, 1925 |
| 1,898,694 | Sikorsky | Feb. 21, 1933 |
| 2,476,857 | Grafinger | July 19, 1949 |
| 2,516,902 | Musser | Aug. 1, 1950 |
| 2,765,130 | Replogle et al. | Oct. 2, 1956 |
| 2,773,661 | Hudson | Dec. 11, 1956 |

FOREIGN PATENTS

| | | |
|---|---|---|
| 53,764 | Netherlands | Jan. 15, 1943 |